Sept. 1, 1964 A. BUSALA ETAL 3,147,345
GAIN SELECTIVE TELEPHONE SET
Filed April 26, 1961
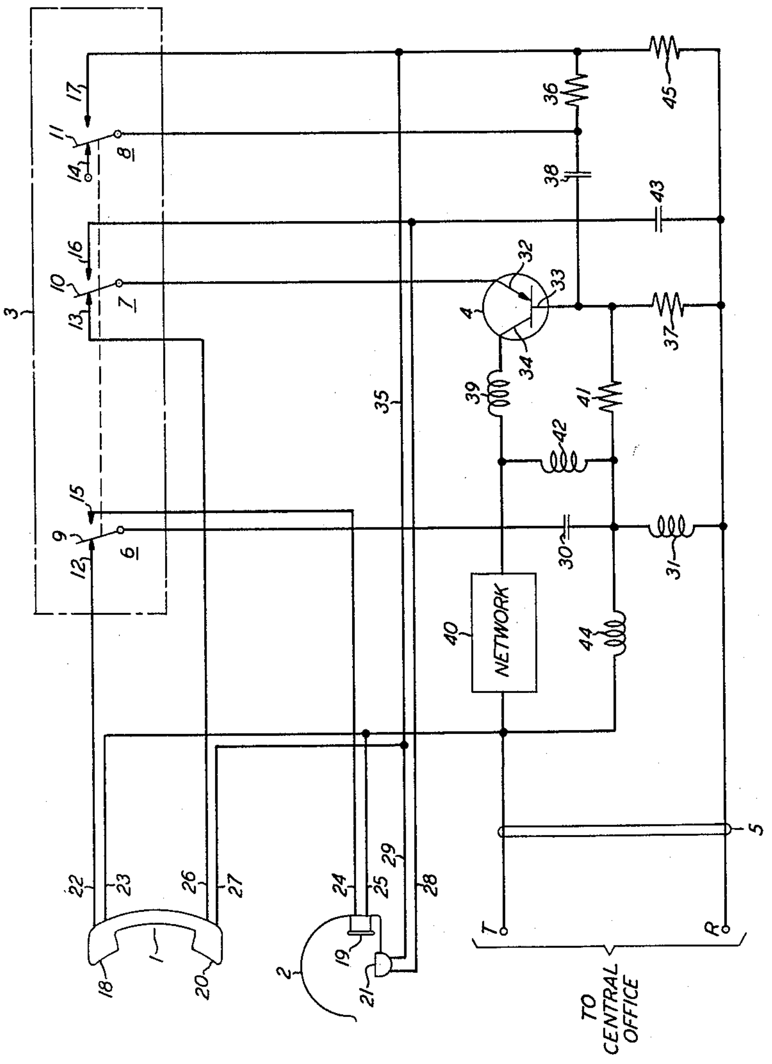
INVENTORS A. BUSALA
J. E. LINSE
BY V. P. Priolo
ATTORNEY

United States Patent Office 3,147,345
Patented Sept. 1, 1964

3,147,345
GAIN SELECTIVE TELEPHONE SET

Alessandro Busala, Berkeley Heights, and John E. Linse, Somerville, N.J., assignors to Bell Telephone Laboratories, Incorporated, New York, N.Y., a corporation of New York Filed Apr. 26, 1961, Ser. No. 105,660
6 Claims. (Cl. 179—81)

This invention relates to signal translating devices and more particularly, although in its broader aspects not exclusively, to telephone sets comprising amplifying elements of the variety which are connectable into several distinct amplifying configurations.

Speech circuits of the type generally incorporated into subscriber telephone sets conventionally comprise transmitter and receiver arrangements which are coupled to a telephone line in some form of anti-sidetone configuration. The transmitter, in many instances, includes an encapsulated, carbon granule type microphone which is bridged across the line and biased by current emanating from a central office. Sound waves impinging on the microphone's diaphragm modulate the impedance of the carbon element, thereby effectively impressing speech signals on the direct current.

It can be shown that the gain of a microphone of the type described varies directly as a function of its bias current. In many types of telephone systems the magnitude of permissible line current available for biasing purposes imparts sufficient gain to the microphone so that speech signals may be applied to the line without amplification and still be detected at a called subscriber's set. However, in Electronic Switching Systems, such as the one disclosed in U.S. Patent 2,965,165, granted to Messrs. W. A. Budlong, G. C. Drue, and J. A. Harr on October 14, 1960, the permissible level of such line current, and hence microphone gain, is greatly reduced. In order to compensate for this reduction in gain it has been found necessary to incorporate within an individual telephone set means for amplifying a transmitted signal before its application to the line. In the past, such means have generally included a transistor arranged in the so-called "common" base configuration as disclosed in U.S. Patent 2,808,462, granted on October 1, 1957, to L. A. Meacham.

In addition to being subject to variation with respect to line current, the output strength of microphones of the type described also varies directly as a function of diaphragm size. In certain situations, therefore, it may be necessary to vary the amplification factor of a set's amplifying means in order to compensate for a change in diaphragm size of the set's transmitter. One such situation, by way of example, involves switchboard or similar operator controlled equipment, in which it has been found both convenient and comfortable to provide the operator with both a handset and a headset which may be used interchangeably as traffic dictates. Since there is a disparity in size between the diaphragms of the transmitting elements of these two devices, the handset's diaphragm being the larger, a concomitant gain differential arises. To reduce this undesirable differential the gain of the set's amplifying means must be varied selectively depending on which transmitter is in use.

Accordingly, it is the principal object of this invention to amplify signals selectively to distinct predetermined levels using a simplified network comprising a minimum number of active elements.

It is a more specific object of this invention to render a low current telephone set compatible for use with transmitter microphones of various sizes.

According to the principles of the invention, a signal translating device comprises an amplifier which is connectable between an input and a load circuit in a plurality of distinct amplifying configurations, and means are provided for selectively intercoupling the amplifier with the input and load circuits in more than one of these configurations.

In an illustrative embodiment of the invention, to be described in greater detail below, a transistorized operator's telephone set incorporates both a handset and headset which may be used interchangeably on an exclusive basis. Bias current for both the transmitters and the transistor originates from a central office and is directed through the set by means of a switchhook arrangement. The switchhook comprises a plurality of two-position switches which, depending on their position, individually couple the transmitter of either the handset or the headset to the line via the transistor. The switchhook is arranged, according to the invention, to connect the transmitter of the handset, when the switches reside in one position, to the transistor in the common base configuration in order to impart a lower level of gain to speed signals generated by the instrument having the larger diaphragm, and to connect the transmitter of the headset, when the switches reside in the other position, to the transistor in the common emitter configuration so as to impart a higher level of gain to speed signals generated by the instrument having the smaller diaphragm.

One feature of the invention resides in a transistor amplifier combined with a switching arrangement in such manner that the transistor is rendered selectively operative in more than one of its amplifying configurations.

Another feature of the invention resides in the interconnection of the switchhook, the transistor and the transmitter of a low current telephone set so as to amplify speech signals with the transistor selectively connected in either the common base or the common emitter configuration.

Another feature of the invention resides in an arrangement for selectively incorporating the transmitter portion of either a handset or an operator's headset into a low current telephone set in such manner that regardless of the particular selection, the set's output signal remains at a substantially constant level.

The foregoing and other objects and features of the invention will be more thoroughly understood by reference to the following detailed specification and the accompanying drawing which illustrates the invention incorporated in a low current operator's telephone set.

With reference directed to the drawing, the speech circuit of a low current operator's telephone set is shown comprising a handset 1 and a headset 2 interchangeably connectable through a switchhook 3 and a transistor 4 to a telephone line 5 which terminates in a central office. Switchhook 3 comprises two-position switches 6, 7 and 8 having, respectively, ganged armatures 9, 10 and 11, front contacts 12, 13 and 14 and back contacts 15, 16 and 17. When the armatures are thrown left, as in the drawing, the set is in the "off-hook" condition and handset 1 is coupled to the line in a manner to be described below. Similarly, when the armatures are thrown to the right, engaging the back rather than the front contacts, the set is in the "on-hook" condition and headset 2 is coupled to the line. Switchhook 3 is of a conventional variety having the position of its armatures controlled by a supporting mechanism, not shown, in which handset 1 is seated when not in use.

Both handset 1 and headset 2 includes standard receiver portions, shown generally as 18 and 19, respectively, and carbon granule type transmitters shown as 20 and 21, respectively. Each of the receiving and transmitting circuits is of the two-wire type, receivers 18 and 19 respectively being terminated in leads 22 and 23, and 24 and 25, respectively, and transmitters 20 and 21 being terminated in leads 26 and 27, and 28 and 29, respectively.

The receiving circuits of handset 1 and headset 2 are selectively bridged across line 5 by switch 6. As shown, leads 23 and 25 of receivers 18 and 19, respectively, are connected directly to the tip conductor of the line, and leads 22 and 24 are respectively connected to front and back contacts 12 and 15 of switch 6, armature 9 selectively completing the connection to the ring conductor of the line through serially connected capacitor 30 and winding 31.

The transmitting circuits of handset 1 and headset 2 are selectively coupled to line 5 through transistor 4 by switches 7 and 8, the selection of which instrument is coupled to the line being based on the position, right or left, of armatures 10 and 11. When the set is in the "off-hook" condition, armatures 10 and 11 being positioned as shown in the drawing, lead 26 of the transmitter 20 is connected to emitter 32 of transistor 4 through a path comprising front contact 13 and armature 10 of switch 7, and lead 27 is connected to base 33 through a path comprising conductor 35 and serially connected resistors 36 and capacitor 38. When the set is in the "on-hook" condition, armatures 10 and 11 being directed to the right, lead 28 of transmitter 21 is connected to emitter 32 of transistor 4 through back contact 16 and armature 10 of switch 7, and lead 29 is connected to base 30 by conductor 35, back contact 17 and armature 11 of switch 8 which is now short circuiting resistor 36, and capacitor 38. It will be noted that regardless of which transmitter is coupled to transistor 4, speech signals are applied between the base and emitter electrodes.

As shown in the drawing, transistor 4 is of the PNP variety having its collector 34 coupled to the tip conductor of line 5 by the series combination of winding 39 and a sidetone balancing network 40. Network 40 is of the type conventionally employed in telephone practice to provide an impedance match for the line. Base 33 is coupled both to the ring conductor of line 5 through resistor 37, and to the junction between winding 39 and network 40 by a resistor 41 and a winding 42 connected in series. Windings 31 and 42 are joined at a common point to form part of an induction coil generally found in telephone sets by which speech signals are applied to and extracted from the line.

Direct current for biasing base 33 originates from the central office and flows through a path comprising the ring conductor of line 5, resistors 37 and 41, and is returned to the tip conductor of the line by an audio frequency choke 44. Direct current for biasing emitter 32 originates from the same source and flows through a path comprising a resistor 45, either transmitter 20 or 21 depending on the position of armature 10, armature 10, the emitter-to-collector path of the transistor, winding 39, and is returned to the tip conductor of the line through winding 42 and choke 44. Although many other arrangements may conveniently be used to bias transistor 4, the one described above is particularly advantageous in that it allows maximum current to energize the selected transmitter 20 or 21 by virtue of its being in series with emitter 32.

Before describing the particular arrangement in which signals amplified by transistor 4 are applied to the line, one fundamental attribute common to many types of multielectrode amplifying elements should be recalled, namely their connectability into several amplifying configurations which are distinct from one another in the pairs of electrodes between which input signals are applied and output signals extracted. In the case of transistors, as is familiar to those skilled in the art, two of these configurations are denoted the common base and the common emitter arrangements, these arrangements being similar in that input signals are applied across base and emitter electrodes, but distinct in that output signals of the former are extracted across base and collector electrodes, while output signals of the latter are extracted across emitter and collector electrodes. It is well recognized that the power gain of the latter may exceed that of the former by as much, under matched conditions, as 11 db. In the embodiment of the invention described herein, the inherent gain differential existent between these two configurations is advantageously used in a telephone set to equalize transmitted signals of different amplitude levels before their application to the line.

When the set is in its "off-hook" condition, the armatures of switchhook 3 being positioned as illustrated, transistor 4 is operating in the common base configuration having energy constituting its output signal applied to line 5 by its base and collector electrodes. Resistor 36 serves to increase the impedance of the input circuit of transistor 4, thereby allowing transmitter 20 to operate into a more equally matched load. In addition, a portion of the output signal developed across winding 31 is fed back to resistor 36 via resistor 41, thereby lowering the normally high output impedance exhibited by a common base amplifier to a value approaching the line into which it operates.

When the set is switched to its "on-hook" condition, thereby reversing the position of all armatures, emitter 32 is coupled to the ring conductor of line 5 through a path comprising armature 10, back contact 16 and capacitor 43. Connected in this fashion, transistor 4 is operating in the common emitter configuration having output energy applied to the line by its emitter and collector electrodes. Since the impedance of transmitter 21 is of a lower value than that of transmitter 20, the short circuiting of resistor 36 by back contact 17 and armature 11 tends to provide a match between the output impedance of transmitter 21 and the input impedance of transistor 4. Furthermore, since the output impedance of a common emitted amplifier is of a lower value than that of its common base counterpart, the decrease in feedback to the input circuit of transistor 4 resulting from the short circuiting of resistor 36 does not substantially impair the impedance match between the transistor's output circuit and line. Thus, when the transmitter exhibiting relatively high output signal strength, that is to say transmitter 20, is coupled to the line, transistor 4 is connected in a configuration operative to yield a relatively lowe level of amplification; but when the transmitter exhibiting relatively low output signal strength, that is to say transmitter 21, is coupled to the line, the transistor is connected in a different configuration operative to yield a higher level of amplification.

Although only a single embodiment of the invention is described herein, it should be evident to one skilled in the art, that numerous other arrangements, not necessarily limited to telephones, may be constructed without departing from the spirit and scope of the invention.

What is claimed is:

1. A signal translating device comprising a transistor, an input circuit for said transistor, a load circuit for said transistor, switching means characterized by at least first and second operative positions, means responsive to said switching means being rendered in said first position for connecting said input circuit and said load crciuit to said transistor in the common base configuration, means responsive to said switching means being rendered in said second position for connecting said input circuit and said load circuit to said transistor in the common emitter configuration, and means for selectively positioning said switching means.

2. Signal translating apparatus comprising, in combination, an amplifying device having a plurality of electrodes, a first input circuit connected across a first pair of said electrodes, a second input circuit, a load circuit connected across a second pair of said electrodes, switching means, and means responsive to said switching means for disconnecting said first input circuit from across said first pair of said electrodes, for connecting said second input circuit across said first pair of said electrodes, and for shifting the connection of said load circuit from across said second pair of said electrodes to a third pair of said electrodes, thereby to provide substantially different amplification factors for said first and second input circuits.

3. Apparatus in accordance with claim 2 wherein said amplifying device comprises a transistor having a base electrode, an emitter electrode and a collector electrode.

4. A transmission circuit comprising, in combination, a transistor having a base electrode, an emitter electrode and a collector electrode, a load circuit, means including a first and a second input circuit for applying input signals to said transistor for amplification by said transistor, switching means for selectively coupling each of said input circuits individually to an identical pair of said electrodes, and means operative under the control of said switching means for severally connecting said load circuit to different pairs of said electrodes according to which of said input circuits is coupled to said identical pair, whereby said input signals from said first circuit and input signals from said second circuit may be amplified, selectively, by said transistor by a first and a second amplification factor, respectively.

5. A communication system comprising, in combination, a telephone set, first and second speech circuit means included in said set, a telephone line, an amplifying device having a plurality of electrodes, switching means for selectively switching each of said speech circuits across an identical pair of said electrodes, means responsive to said switching means for connecting either of two different pairs of said electrodes to said telephone line according to the particular one of said speech circuits that is connected across said identical pair of said electrodes, thereby to provide a different amplification factor for each of said speech circuits.

6. Apparatus in accordance with claim 5 including means responsive to said switching means for matching the output impedance of one of said speech circuits to the input impedance of said amplifying device upon the connection of said last named one of said speech circuits across said identical pair of said electrodes.

References Cited in the file of this patent

UNITED STATES PATENTS

| | | |
|---|---|---|
| 2,490,943 | Breune | Dec. 12, 1949 |
| 2,496,398 | Lambert | Feb. 7, 1950 |
| 2,691,073 | Lowman | Oct. 5, 1954 |
| 2,813,152 | Blow | Nov. 12, 1957 |
| 2,883,456 | Jaenke et al. | Apr. 21, 1959 |
| 2,894,075 | Kunkle | July 7, 1959 |
| 2,896,022 | Wooten | July 21, 1959 |
| 2,906,831 | MacDonald | Sept. 29, 1959 |
| 2,976,369 | Salzer | Mar. 21, 1961 |